United States Patent
Boye

(10) Patent No.: US 11,488,396 B2
(45) Date of Patent: Nov. 1, 2022

(54) USER AUTHORIZATION FOR SHARED VEHICLE

(71) Applicant: Volkswagen Aktiengesellschaft, Wolfsburg (DE)

(72) Inventor: Pit Boye, Falkensee (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 497 days.

(21) Appl. No.: 16/696,646

(22) Filed: Nov. 26, 2019

(65) Prior Publication Data

US 2020/0167579 A1     May 28, 2020

(30) Foreign Application Priority Data

Nov. 28, 2018    (DE) .......................... 102018220433.0

(51) Int. Cl.
     *G06V 20/59*      (2022.01)
     *G06K 9/00*       (2022.01)
     (Continued)

(52) U.S. Cl.
     CPC .............. *G06V 20/59* (2022.01); *B60R 25/04* (2013.01); *B60R 25/25* (2013.01); *B60R 25/305* (2013.01);
     (Continued)

(58) Field of Classification Search
     CPC ...... G06V 20/59; G06V 30/418; G06V 40/10; G06F 16/903; G07C 9/25; B60R 25/04;
     (Continued)

(56) References Cited

U.S. PATENT DOCUMENTS 7,130,454 B1 * 10/2006 Berube ................ G06V 40/169
                                                                       382/118
10,351,098 B2     7/2019   Gennermann
                           (Continued)

FOREIGN PATENT DOCUMENTS

CN         107590763 A     1/2018
CN         107730641 A     2/2018
                  (Continued)

OTHER PUBLICATIONS

Chinese Office Action for application No. 201911188892.1, dated Dec. 1, 2021. (13 pages).

(Continued)

*Primary Examiner* — Thomas D Alunkal
(74) *Attorney, Agent, or Firm* — Loza & Loza, LLP; Peter Zura

(57) ABSTRACT

A shared vehicle authenticates a holder of a driver's license prior to the holder accessing and operating the shared vehicle. Previously captured biometric data of at least one biometric feature of the holder of the driving license is obtained from the driver's license. Newly captured biometric data of a corresponding biometric feature of the holder is detected when the holder wants to operate the shared vehicle. The previously captured biometric data and the newly captured biometric data are compared to verify the holder is authorized to operate the shared vehicle. When the biometric data match, the shared vehicle is released for use by the holder. In some instances, biometric data of the driver of the shared vehicle is captured at select times while the shared vehicle is operated to confirm the driver is the holder of the driver's license.

21 Claims, 2 Drawing Sheets

(51) Int. Cl.
*G07C 9/25* (2020.01)
*B60R 25/25* (2013.01)
*G06F 16/903* (2019.01)
*B60R 25/04* (2013.01)
*B60R 25/30* (2013.01)
*G06K 9/62* (2022.01)
*G06V 30/418* (2022.01)
*G06V 40/10* (2022.01)
*B60R 16/037* (2006.01)

(52) U.S. Cl.
CPC ......... *G06F 16/903* (2019.01); *G06K 9/6201* (2013.01); *G06V 30/418* (2022.01); *G06V 40/10* (2022.01); *G07C 9/25* (2020.01); *B60R 16/037* (2013.01)

(58) Field of Classification Search
CPC ..... B60R 25/25; B60R 25/305; B60R 16/037; G06K 9/6201
See application file for complete search history.

(56) References Cited

U.S. PATENT DOCUMENTS

| | | | | |
|---|---|---|---|---|
| 2005/0193212 A1* | 9/2005 | Yuhara | ............... | G07C 9/00309 713/186 |
| 2008/0147246 A1* | 6/2008 | Cochran | ................ | G07C 9/257 701/1 |
| 2013/0311001 A1* | 11/2013 | Hampiholi | ............. | B60R 25/25 701/1 |
| 2014/0247348 A1* | 9/2014 | Moore, Jr. | ........... | G06Q 10/101 701/1 |
| 2016/0082926 A1 | 3/2016 | Mouser et al. | | |
| 2016/0140649 A1 | 5/2016 | Kleve et al. | | |
| 2017/0080900 A1* | 3/2017 | Huennekens | .......... | G08B 21/00 |
| 2018/0215392 A1* | 8/2018 | Kosaka | ................. | B60W 50/12 |
| 2019/0192055 A1* | 6/2019 | Mizobuchi | ............. | B60R 16/02 |

FOREIGN PATENT DOCUMENTS

| | | |
|---|---|---|
| CN | 107792009 A | 3/2018 |
| CN | 107808153 A | 3/2018 |
| CN | 108313011 A | 7/2018 |
| CN | 108791192 A | 7/2018 |
| DE | 102012009019 A1 | 11/2013 |
| DE | 102013114394 A1 | 6/2015 |
| DE | 102015119215 A1 | 5/2016 |
| DE | 102016217890 A1 | 3/2018 |
| DE | 102017202834 A1 | 8/2018 |
| EP | 3505404 A1 | 7/2019 |
| JP | 2016141349 A | 8/2016 |
| WO | 2005/093637 A1 | 10/2005 |
| WO | 2011/1478413 A1 | 12/2011 |
| WO | 2018043100 A1 | 3/2018 |

OTHER PUBLICATIONS

Identity Trust Management AG, accessed Nov. 26, 2019. Available Online at: https://www.identity.tm/video.html.

* cited by examiner

USER AUTHORIZATION FOR SHARED VEHICLE

CROSS-REFERENCE TO RELATED APPLICATION(S)

This patent application claims priority to German patent application DE 10 2018 220 433.0, which was filed on Nov. 28, 2018, the entire disclosure of which is hereby incorporated by reference.

BACKGROUND

Car sharing is an organized joint use of motor vehicles by different users. Car sharing is becoming increasingly widespread today. In some situations, a user who wants to use a car-sharing service typically performs a one-time registration with a car-sharing service provider. This one-time registration can be performed online, for example, via a web form or a web page, or in person in an office of the car-sharing service provider. When the user registers with the car-sharing service provider, the user provides identification, such as an identity card, a credit card, or a driver's license, which is checked once as part of the registration process. If the identification is valid, the user is approved by the car-sharing provider and allowed to operate shared vehicles owned by the car-sharing provider. In some instances, the user receives a key card, which the user can use to book and operate the shared vehicles. For example, the key card can be held to a reader of a shared vehicle to unlock or operate the vehicle. As a further security measure, if necessary, a personal identification number (PIN) is assigned to, or defined by, the user. The PIN can be entered into the shared vehicle to confirm the user's identity.

In some instances, however, unauthorized use of the car-sharing service can occur. For example, the key card and possibly the PIN may be intentionally or unintentionally passed on to a non-registered third party, enabling the third party to pose as the user and operate a shared vehicle. Additionally, a user who is not entitled to drive a motor vehicle may still be able to use a shared vehicle. For example, if the user has lost his/her driver's license or lost his/her driving privileges due to a traffic violation, the user may still be able to drive a shared vehicle because the car-sharing service provider is not aware that the user is not entitled to drive a motor vehicle.

SUMMARY

In general terms, this patent document relates to authorizing a user for a shared vehicle. In one aspect, biometric data from the identification is compared to biometric data acquired from the user. If the biometric data does not match, an image of the user is transmitted to a screening facility, which reviews the image to determine if he/she is authorized to operate the shared vehicle. In another aspect, biometric data is acquired from the user while the shared vehicle is being operated to verify whether the person driving the shared vehicle is an authorized user. In yet another aspect, one or more settings for ergonomic or comfort components of the shared vehicle are automatically set for the user if he/she is determined to be an authorized user. These and other aspects of the patent document are discussed in more detail herein.

DETAILED DESCRIPTION

Figure 1:
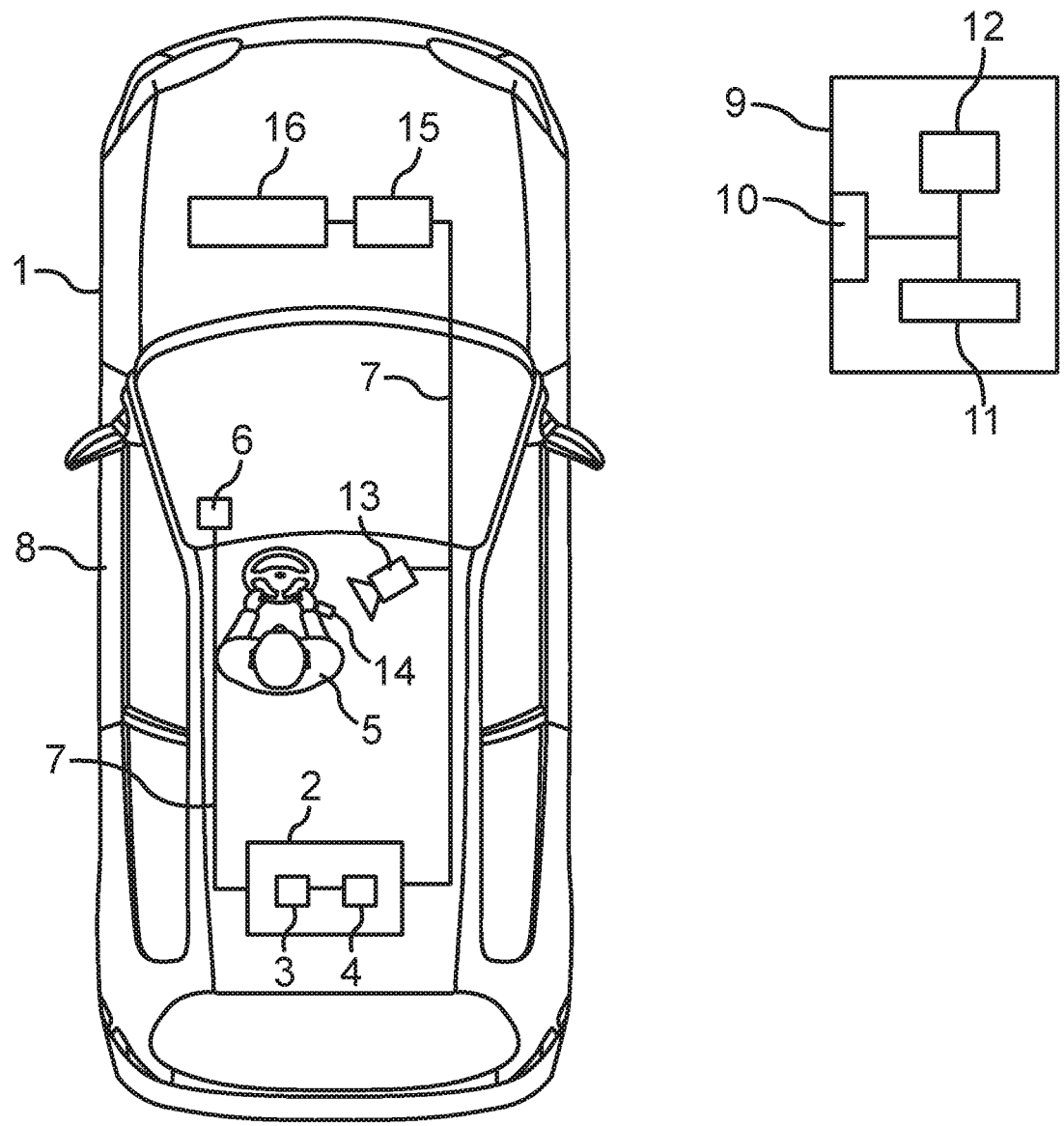
FIG. 1 illustrates an example car-sharing vehicle.

Various embodiments are described in detail with reference to the drawings. Reference to the drawings and the various embodiments in this written specification does not limit the scope of the claims attached hereto. Additionally, the examples set forth in this written description are not intended to be limiting and merely set forth some of the many possible embodiments for the appended claims.

For purposes of this patent document, the terms "or" and "and" shall mean "and/or" unless stated otherwise or clearly intended otherwise by the context of their use. Whenever appropriate, terms used in the singular also will include the plural and vice versa. Use of the term "a" means "one or more" unless stated otherwise or where the use of "one or more" is clearly inappropriate. Use of the terms "comprise," "comprises," "comprising," "include," "includes," "including," "having," and "has" are interchangeable and are not intended to be limiting. For example, the term "including" shall mean "including, but not limited to." The term "such as" also is not intended to be limiting.

Embodiments disclosed herein relate to shared vehicles and methods for operating a shared vehicle. Generally, a shared vehicle is configured to collect data from identification carried by a user or a combination of different identification carried by the user. Examples of such identification include a driver's license, other identification cards such as a credit card or other identification card. Identification also can be a smart phone, memory device, wristband, or other mobile electronic device that stores identification information. The car sharing service also can issue a key card for the user, which can serve as a device to aid in accessing the shared vehicle or even serve as an identification. In example embodiments, the key card can include an identification number or name of the user. The key card also can store biometric data corresponding to the user. A data acquisition device reads or acquires data from the identification. The collected data is then checked to determine if the user is authorized to enter the shared vehicle. If the user is authorized, the shared vehicle is unlocked or released to allow the user to enter the shared vehicle. If the collected data was captured from a key card, the collected data can be compared to information from the user's driver's license that is stored by the car sharing service as further verification that the user is an authorized user.

The data stored on the identification includes biometric data for one or more of the user's biometric features. For example, the biometric data may be stored electronically in the identification such as on a memory chip in the user's driver's license. Alternatively, the biometric data can be printed, encoded, or imaged on a surface of the identification in addition to, or alternatively to, electronically storing data in the identification. A detection device is used to acquire, retrieve, read, or capture biometric data of a corresponding biometric feature or features of the user before the shared vehicle is enabled for operation by the user. The biometric data can be acquired while the user is in the shared vehicle or is near the shared vehicle (e.g., in the immediate vicinity). The biometric data acquired from the user is compared to the biometric data acquired from the identification. The shared vehicle is enabled or released for use by the user when the acquired biometric data matches the biometric data obtained from the identification. In at least some embodiments, biometric data is acquired from the vehicle driver periodically or at select times while the shared vehicle is in operation to confirm that the driver of the shared vehicle is the user who is authorized to use the shared vehicle.

In at least some embodiments, a video connection is established between the shared vehicle and a remote screening facility that is external to the vehicle when the biometric data acquired from the user does not match the biometric data obtained from the identification. The remote screening facility can be operated by screening personnel or can be equipped with automated detection systems such as image recognition systems. The video connection allows the screening personnel to interact with the user to determine whether the user is authorized to use the shared vehicle. The shared vehicle is then released for use by the user only in response to receiving a release signal from the screening facility or otherwise initiated by the screening personnel or automated detection system.

The screening facility or the screening personnel serves as an additional verification authority that can verify the user is authorized to operate the shared vehicle. An advantage of this system is that the authority of the user to operate the shared vehicle can still be confirmed if the data acquisition device or the detection device are defective or inoperable for any reason such as a technical defect, contamination in the system, unsuitable environmental conditions, an ambiguity of the biometric feature (e.g., an injury of the user), or any other reason. In at least some embodiments, the release signal sent by the screening facility to the shared vehicle overrules or overrides the enabling device in the shared vehicle so that the final authority to the use of the shared vehicle rests with the screening personnel or the automated detection system.

Examples of biometric data include biometric data corresponding to the shape or appearance of a face, a relative arrangement of facial or body features (e.g., the distance between facial or body features), the geometry of facial or body features (e.g., the angle between features, the distance between points on a body, the direction or length ratios of corresponding connecting lines), a body size or circumference, a hand geometry, a hand line structure, a palm vein structure, a fingerprint, a nail bed pattern, an ear shape, an iris or retina pattern, or a voice pattern. In some instances, a combination of a plurality of biometric data or data points or features may be used to provide a more accurate or reliable identification and authentication of the user.

The enabling, releasing, or commissioning of the shared vehicle can be actions such as disabling the electronic immobilizer or otherwise enabling the engine to be started, or the drive system to be engaged. The data from the identification is checked before the user can start the shared vehicle. Functions that are not relevant or related for the commissioning (e.g., enablement) of the shared vehicle can be blocked until the user's authority to operate the shared vehicle is determined. Examples of such functions include opening a door of the shared vehicle and switching on a lighting device. Thus, the user can actually only start the vehicle, i.e., put it into operation, if there is a clear assignment or correspondence between the user actually located on site and the identification used for authentication. The identity and authorization of the user who currently wants to use the shared vehicle is confirmed to be the holder of the identification (e.g., driver's license).

Embodiments disclosed herein can prevent the unauthorized use of the shared vehicle. For example, a user who is registered with a car-sharing service provider cannot give his/her driver's license to an unregistered third party so the third party can use a shared vehicle. Additionally, a user who is registered with the car-sharing service is unable to initially enable a shared vehicle and then allow an unregistered third party to operate the shared vehicle. Additionally, functions or operations other than starting or driving the vehicle also can be blocked until the user's authority to operate the shared vehicle is determined. Examples of functions or operations that can be blocked include opening a door of the shared vehicle, accessing the trunk or storage area, or turning on the lights or other auxiliary electronics.

FIG. 1 illustrates an example car-sharing vehicle. The car-sharing vehicle 1 includes an unlocking or enabling device 2 operably connected to a control unit 15 and a drive system 16 through a wired or wireless electrical connection 7. The control unit 15 can include one or more communication devices such as a cellular communication device or other networking interface for connecting to a remote device, the Internet, or any other data network. The drive system 16 operates the shared vehicle 1.

The enabling device 2 includes at least one processor device 4 in data communication with at least one computer-readable storage device 3. The processor device 4 can include one or more processing units. A processing unit is a physical device or article of manufacture comprising one or more integrated circuits that selectively execute software instructions. The processing units can be a generally programmable processor such as a microprocessor, an application-specific integrated circuit (ASIC) that provides specific functionality, or any other suitable electronic controller. The enabling device 2 also can include other forms of memory such as random access memory (RAM) or buffers. Additionally, the car-sharing control device 2 can be a processing unit physically separate from other computers and processors onboard the shared vehicle 1. Alternatively, the functionality can be integrated in the shared vehicle's 1 onboard computers and processors. In this example embodiment, the instructions for authorizing a user 5 and enabling the vehicle 1 can be executed by computers and processors onboard the shared vehicle 1 that also performed other functions and that control other aspects of the vehicle. The computer-readable storage device 3 stores instructions, that when executed by the processor device 4, cause a method of operating the car-sharing vehicle 1 to be performed. Additionally, the computer-readable storage medium 3 can be any suitable form of static computer memory such as a magnetic hard drive, solid-state memory device, or optical memory.

An access device 6 interfaces with the enabling device 2 via one or more electrical conductors in the shared vehicle's 1 wiring harness or electrical system 7. In an alternative embodiment, the access device 6 communicates with the enabling device 2 via a wireless data connection. The access device 6 interfaces with the user's 5 identification to retrieve data from the user's 5 identification. In at least some example embodiments, the identification includes an RFID tag and the access device 6 includes an RFID reader for interfacing with the RFID tag and retrieving information. In other example embodiments, the access device 6 includes magnetic card readers, cameras or other image sensors, scanners, Bluetooth® radios, fingerprint sensors, or any other suitable device that can retrieve, capture, or otherwise obtain identifying data from the identification or from the user 5. In one embodiment, the access device 6 transmits the data collected from the identification or key card to the enabling device 2 via the electrical system 7. The enabling device 2 then determines whether the user 5 is authorized to enter the shared vehicle 1. If so, the access device 6 or the enabling device 2 automatically unlocks a door 8 of the shared vehicle 1 to allow the user 5 to enter the shared vehicle 1. In at least some alternative embodiments, the data acquisition device for retrieving data from the identification can be integrated directly into the access device 6. The access device 6 can interface with the shared vehicle's 1 electronic or electromechanical locking mechanism, and can control the locking mechanism to unlock a door 8 on the shared vehicle 1 upon successfully reading an identification of an authorized user 5 as discussed in more detail herein.

In another embodiment, the data collected from the identification is transmitted to a server device 9 to determine whether the user 5 is authorized to enter the shared vehicle 1. The server device 9 includes a communication device 10 in data communication with a server processor device 12 so that the server device 9 can be in data communication with the control unit 15 of the shared vehicle 1. The communication device 10 can be any suitable communication device. Examples of suitable communication devices include cellular communication devices, and other networking interfaces for connecting to a remote device, the Internet, or any other data network.

A memory 11 is operably connected to the server processor device 12 and the communication device 10. The memory 11 stores a database of access requests and authorizations. Depending on the result of processing the data to determine if the user 5 is authorized to access the shared vehicle 1, the server device 9 can transmit a corresponding data signal to the control unit 15 in the shared vehicle 1 via the communication device 10 to cause the shared vehicle 1 to unlock the door 8 or deny access or entry.

In at least some example embodiments, a detection device 13 is operably connected to the enabling device 2 via electrical conductors in the electrical system 7. In alternative embodiments, the detection device 13 is connected to the enabling device 2 via a wireless connection. The detection device 13 includes at least one sensor for capturing data. Examples of sensors include image sensors for a camera, an optical scanner or sensor, a fingerprint sensor, a card reader, and RFID reader, a Bluetooth® radio, or any other suitable device that can retrieve, capture, or otherwise obtain data from the user's 5 identification, directly from the user 5, or combinations thereof. In at least some embodiments, the detection device 13 also operates as a data acquisition device. In these embodiments, the detection device 13 includes processors or other programmable circuits that execute program modules or other program code for processing the data captured by the sensors. In alternative embodiments, the detection device 13 is primarily a sensor and the enabling device 2 executes the program modules or other program code for processing the data captured by the sensors. In these alternative embodiments, the detection device 13 and the enabling device 2 cooperate to function as the data acquisition device. Although the enabling device 2 and the detection device 13 are illustrated as separate devices in FIG. 1, other embodiments are not limited to this implementation. For example, the enabling device 2 and the detection device 13 can be integrated or combined in a single device or be components in a single unit.

In example embodiments, the computer-readable storage device 3 stores a registration database that holds corresponding data from users 5 registered with or logged into the car-sharing service provider of the shared vehicle 1. Examples of data stored in the registration database include the name, address, date of birth for users 5. The data that is detected or captured from the users 5 identification by an access device 6 or detection device 13 can be compared to data for the user 5 stored in the registration database. In alternative embodiments, the registration database is stored in a memory of a server device or a cloud server (e.g., server device 9). If the registration database is stored in memory outside the shared vehicle 1, the enabling device 2 can automatically generate and send a query to the server device 9 to retrieve data from the registration database.

In various embodiments, the detection device 13 has sensors that detect light having nonvisible wavelengths in addition to or alternatively to light having visible wavelengths. In at least some example embodiments, the detection device 13 has sensors that detect light in the infrared or ultraviolet range of the spectrum. Additionally, the detection device can include a light source that radiates light in the visible spectrum, radiates light in the nonvisible spectrum such as infrared or ultraviolet wavelengths, or radiates light in both the visible and nonvisible spectrums. An advantage of these embodiments is that the detection device can acquire images or other biometric data in a variety of conditions such as smoky environments or in low-light conditions.

In at least some example embodiments, the enabling device 2, the access device 6, the detection device 13, the control unit 15, and the drive system 16 are fixedly installed in the shared vehicle 1. In other words, the enabling device 2, the access device 6, the detection device 13, the control unit 15, and the drive system 16 are components of the shared vehicle 1 and always remain in the shared vehicle 1 even when the user 5 changes. In this way, reliable operation, availability of the devices in the shared vehicle 1, and their compatibility with each other can be ensured. This ultimately leads to an advantageous ease of operation and use of the shared vehicle 1. The data acquisition device and the detection device 13 can be designed and arranged for use by the user 5 when the user 5 is located in an interior of the shared vehicle 1, which allows for comfortable and weather-independent use of the equipment. Alternatively, the data acquisition device and the detection device 13 can be arranged for use or operation by the user 5 when the user 5 is located outside the shared vehicle 1. For example, the data acquisition device and the detection device 13 can be integrated in an outer skin of the shared vehicle 1 or designed and arranged to detect or read the identification 14 or the one or more biometric features of the user 5 through a transparent pane of the shared vehicle 1. As such, unauthorized access to the interior of the shared vehicle 1 can be prevented. The shared vehicle 1 is unlocked only when the authority of the user 5 to enter the shared vehicle 1 is determined. Accordingly, in some embodiments, it may be possible to dispense with the issuing of a key card by the provider of the car-sharing service, which in turn can lead to improved security and to making use of the shared vehicle 1 more convenient, because the user 5 does not have to carry the key card to be able to use the shared vehicle 1.

Additionally or alternatively, a mobile electronic device can be used by the user 5 to gain entry into the shared vehicle 1. In one embodiment, the mobile electronic device is used to capture or acquire biometric data of one or more biometric features of the user 5 or to acquire data from the user's 5 identification 14 (e.g., the driver's license). The mobile electronic device may be, for example, a mobile phone (smartphone), a tablet computer, or a wearable computing device. A data connection between the mobile electronic device and the shared vehicle 1 is established. The data connection may be a Bluetooth®, WLAN or USB connection, or any other suitable data connection. A sensor system of the mobile electronic device (e.g., a camera, fingerprint sensor) is used to read or capture the user's 5 identification 14 (e.g., driver's license) or to detect the at least one biometric feature of the user 5. Corresponding data or signals are then transmitted via the data connection to the enabling device 2 of the shared vehicle 1 for carrying out the method described herein. In some situations, a combination of the mobile device and the data acquisition device can be used. For example, the identification 14 is detected by the data acquisition device permanently installed in the shared vehicle 1, while the at least one biometric feature of the user 5 is detected by the mobile electronic device, or vice-versa. In yet another example embodiment, the mobile electronic device operates as both the access device 6 and as the detection device 13.

The use of the mobile electronic device as the data acquisition device or as the detection device 13 can enable the use of the shared vehicle 1 to be more cost effective. For example, additional hardware does not necessarily have to be installed in the shared vehicle 1. Due to the almost all-encompassing distribution of sufficiently powerful mobile electronic devices, a shared car system using a mobile electronic device is particularly easy to implement in practice. In addition, the use of the mobile electronic device can improve user convenience because the user 5 is typically familiar with his/her mobile electronic device and can position the mobile electronic device comfortably and flexibly.

In some embodiments, the shared vehicle 1 can include a display device, for example a screen arranged in the instrument panel or the like. The display device can be used for a video conference (via a video connection) with an external screening facility. The ability to have a video conference may improve the user-friendliness or ease of use of the car-sharing service when the authority of the user 5 to operate the shared vehicle 1 is initially denied or is not clear as discussed in more detail herein. The display device and the video conference allow the user 5 to clarify or confirm his/her authority to operate the shared vehicle 1. A data signal generated by the data acquisition device or the detection device 13 can be transmitted to the external screening facility to enable a review or reevaluation of the user 5 by screening personnel at the external screening facility.

Because biometric data is sensitive in terms of data protection and personal rights, the biometric data can be stored locally in the shared vehicle 1. In this way, no central data processing center or database must be set up or operated in which the corresponding biometric data and characteristics of all users of the car-sharing service are available or processed. An advantage of this system is that the sensitive biometric data and characteristics of the user 5 do not have to be known to the provider of the car-sharing service and do not need to be permanently stored in a computer system. For example, the biometric data acquired while the user 5 is in or near the shared vehicle 1 may be held in a volatile RAM or other buffer and discarded or deleted upon successful verification, after the shared vehicle 1 is released, or when the user 5 completes his/her use of the shared vehicle 1.

Figure 2:
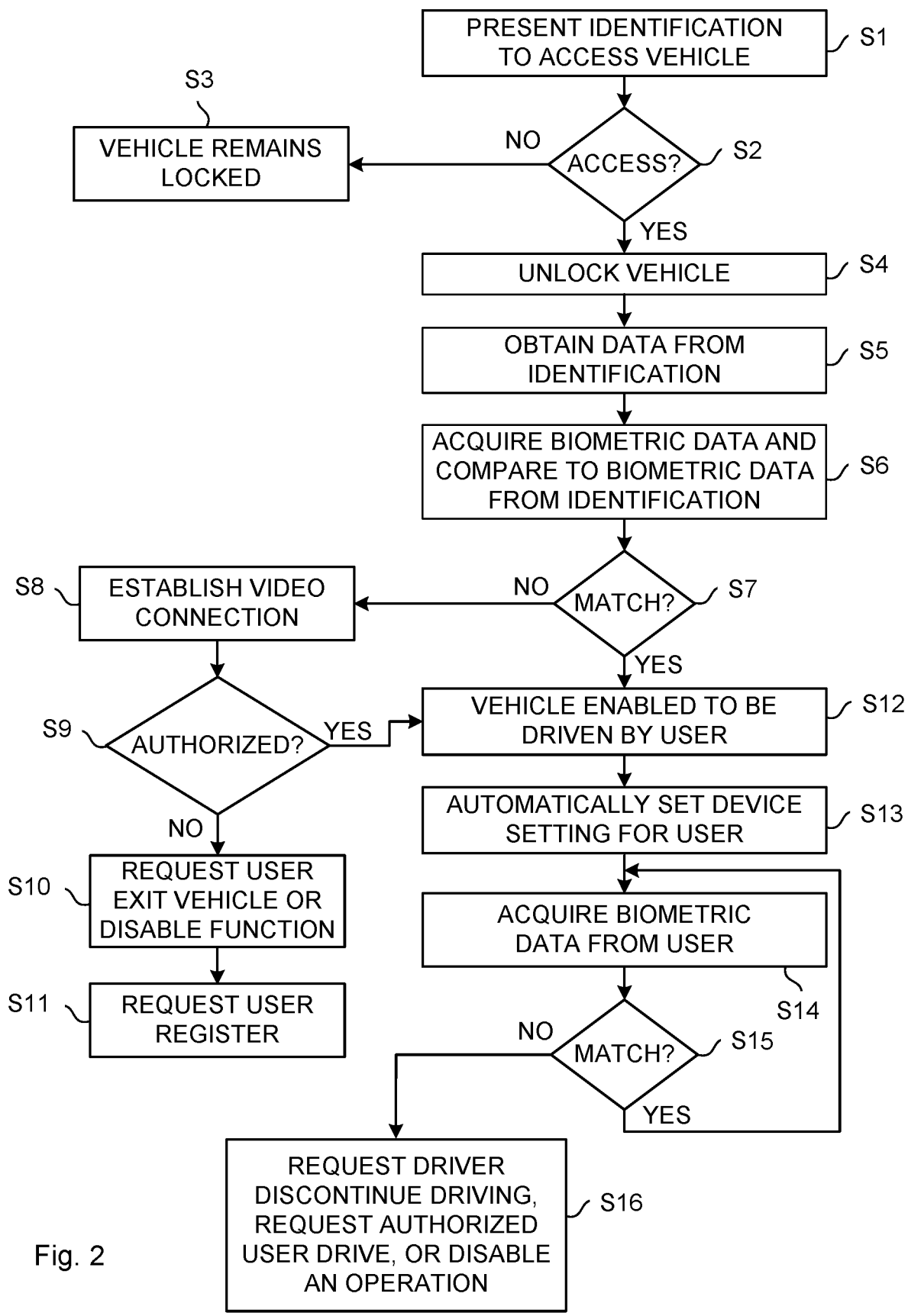
FIG. 2 illustrates a flowchart of an example method of operating the car-sharing vehicle shown in FIG. 1.

FIG. 2 illustrates a flowchart of an example method of operating the car-sharing vehicle shown in FIG. 1. When a user 5 wants to use a shared vehicle 1, the user 5 first approaches the vehicle from the outside. The user 5 presents an identification to the access device 6 of the vehicle 1 (operation S1). The access device 6 retrieves the identifying information from the identification and transmits it to an enabling device 2. Based on the data, the enabling device 2 determines whether the user 5 is authorized to enter the vehicle 1 (operation S2). In some embodiments, the determination of whether the user 5 is authorized to access the shared vehicle 1 can be performed by the server device 9. As discussed herein, the shared vehicle 1 and the server device 9 can each include a communication device for establishing a communication connection between the shared vehicle 1 and the server device 9. The data obtained from the identification is transmitted to the server device 9 and processed by a server processor device 12. The server processor device 12 is in data communication with the memory 11, which stores the determinations regarding access authorization. For example, the access authorizations can be stored in a database in the memory 11. Depending on the result of the processed data, the server device 9 transmits a corresponding data signal to the shared vehicle 1, whereupon the shared vehicle 1 can unlock the door 8 (operation S4) or deny access to the user 5 (operation S3).

For example, a user 5 attempting to access the shared vehicle 1 uses his or her driver's license 14 to access the shared vehicle 1. Data on the user's 5 driver's license 14 includes the name and biometric data of the person to whom the driver's license 14 belongs. In some embodiments, the driver's license 14 is checked at operation S2 to determine if the driver's license 14 is valid, whether the driver's license 14 entitles the person to operate a vehicle in the same vehicle class of the shared vehicle 1, and whether the holder of the driver's license 14 currently has a driving ban imposed on him or her. If it is ascertained that the holder of the driver's license 14 is not entitled to drive the shared vehicle 1, or if the person is not otherwise authorized to enter the vehicle, the shared vehicle 1 remains locked and disabled (operation S3) such that the user 5 cannot enter or operate the vehicle 1. In at least some example embodiments, a notification is provided to the user 5 to inform him/her that they do not have authority to access the shared vehicle 1. The status of the user's driver's license 14 can be checked by accessing third-party databases such as a database maintained by police, a department of motor vehicles that issues and maintains driver's licenses, or any other authority that tracks such information. In alternative embodiments, the car sharing service maintains a database identifying users 5 who are permitted to use a shared vehicle 1, users 5 who are not currently authorized or permitted to use a shared vehicle 1. In other example embodiments, the database identifies all users 5 of the car sharing service as being either authorized or unauthorized to use a shared vehicle 1.

When the user 5 is authorized to enter the shared vehicle 1, the enabling device 2 automatically unlocks a door 8 of the shared vehicle 1 (operation S4). After the shared vehicle 1 is unlocked, the user 5 enters the vehicle. The detection device 13 then scans the user's 5 identification to retrieve biometric data related to the user 5 (operation S5). The identification scanned by the detection device 13 can be the same identification that was presented to the access device 6. In alternative embodiments, the user 5 presents one type of identification (e.g., key card) to the access device 6 and a different identification (e.g., driver's license 14) to the detection device 13. The detection device 13 retrieves biometric data from the identification. For example, if the detection device 13 is a camera and the identification is a driver's license 14, the user 5 will hold the driver's license 14 in front of or proximal to the camera so that the camera can capture an image of the license 14. Additionally, the camera or detection device 13 can also include a reader to read, scan, or otherwise obtain biometric data from the license 14.

In at least some embodiments, if the user 5 presents his/her driver's license 14 to the detection device 13, the system can analyze the image of the driver's license or analyze the data retrieved from the driver's license to verify authenticity of the driver's license. An advantage of this verification, is that it can prevent an unauthorized user from using a forged driver's license to operate the shared vehicle 1. In at least some example embodiments, the system can similarly verify the authenticity of identification other than driver's licenses.

In at least some alternative embodiments, the user 5 uses a mobile electronic device such as a smart phone having a camera to take an image of the identification or retrieve biometric data from the identification. In these alternative embodiments, the mobile electronic device retrieves the data and then transmits the data to the enabling device 2 for processing. In yet other alternative embodiments as noted herein, the mobile electronic device serves as the identification device, in which case it just transmits the identifying information to the enabling device 2.

The detection device 13 also captures biometric data directly from the user 5 (operation S6). For example, if the detection device 13 is a camera, it can capture an image of the user's 5 face or other part of his/her body. In other embodiments, the detection device 13 can include a fingerprint scanner and the user 5 can scan his/her fingerprint. The detection device 13 provides this biometric data to the enabling device 2. As noted herein, the detection device 13 can include other types of scanners, readers, and devices to capture different types of biometric data.

The biometric data retrieved from the user's 5 identification and the biometric data captured directly from the user 5 are then compared (operation S7). If it is determined that the biometric data does not match, a video connection from the detection device 13 and the external screening facility is established (operation S8). In at least some example embodiments, screening personnel review the image of the user 5, and identify the user 5 and determine whether the user 5 is authorized to use the shared vehicle 1 (operation S9). In alternative embodiments, as noted herein, the external screening facility can include an image recognition system to automatically identify the user 5 and determine whether the user 5 is authorized to drive the shared vehicle 1. If it is determined that the user 5 is not authorized to drive the shared vehicle 1, the user 5 may be requested to leave the shared vehicle 1 (operation S10).

The shared vehicle 1 is enabled or commissioned so the user 5 can drive it (operation S12) when either: the user's 5 biometric data acquired by the detection device 13 matches the biometric data retrieved from the identification (operation S7); or the external screening facility authorizes the user 5 to operate the shared vehicle 1 (operation S9). In at least some alternative embodiments, one or more settings for an ergonomic device or a comfort device are automatically set by the shared vehicle's 1 control system as a function of the data obtained from the identification or that are related to at least one detected biometric feature (operation S13). In this embodiment, the memory 3 in the enabling device 2 or the memory 11 in the server device 9 can store settings for each user 5. Examples of components of a shared vehicle 1 that can have ergonomic settings that are automatically controlled include the seat position, steering wheel position, mirror position, and settings for a cluster instrument panel. Automatically setting or adjusting the ergonomic or comfort devices can increase ease of use of the shared vehicle 1, and also can increase safety when driving the shared vehicle 1. For example, an ergonomically correct setting of the driver's seat, steering wheel, or mirrors can improve operability of the shared vehicle 1, improve the user's 5 view of surrounding traffic, and reduce the user's 5 fatigue while driving. For this purpose, physical proportions of the user, such as his/her height, upper body length, leg length or arm length can be used. Examples of comfort devices or other components for which settings can be automatically controlled include HVAC temperature settings, radio presets and other settings for the multimedia or infotainment system, a navigation device. The shared vehicle 1 can also be programmed to output an audible or visible greeting or instruction to the user 5 that is personalized, customized, or tailored. In at least some embodiment, the navigation system can be automatically programmed with a determined destination such as the user's 5 home or work address.

Other settings of the shared vehicle 5 that can be stored or automatically implemented based on the identity of the user 5 include a governor or speed limiting device that restricts the shared vehicle's 1 speed so it does not exceed a certain level, which can be particularly useful for certain classes of people such as user's 5 who are under a certain age or user's 5 who have a determined number of traffic violations. Similarly, the size of letters and numbers displayed on the information cluster, heads up display, or any other display can be increased for certain classes of users 5 such as users 5 who are over a determined age or users 5 who have a glasses rating on their driver's license.

A user-specific profile that retains all of the settings for a particular user 5 can be stored in a database loaded in the memory 3 of enabling device 2, memory 11 of the server device 9, or in any other memory onboard the shared vehicle 1, or in a remote location. The user-specific profile can store parameters defining physical characteristic of user 5 such as body proportions for setting the position of the seat, steering wheel, mirrors, and other components of the shared vehicle 1; the user's 5 age; and other information about the user 5. This user profile then can be automatically retrieved and the preprogrammed settings automatically implemented when the user 5 is authenticated for using the shared vehicle 1. In at least some alternative embodiments, some or all of the settings are not preprogrammed, but are determined based on one or more of the physical characteristics of the user 5.

While the user 5 is operating the shared vehicle 1, biometric data of one or more biometric features of the user 5 is acquired by the detection device 13 to produce newly acquired biometric data (operation S14). The newly acquired biometric data can be acquired periodically, at select times, or at random times (e.g., at regular or irregular intervals). The newly acquired biometric data is then compared with the previously obtained biometric data to determine if the biometric data match (operation S15). The previously obtained biometric data is the biometric data that was detected by the detection device 13 during the process of authorizing the user 5 to operate the shared vehicle 1 or is the biometric data obtained from the user's 5 identification. When the newly captured biometric data matches the previously captured biometric data, the vehicle continues to operate. The operation of acquiring biometric data (operation S14) is repeated until the biometric data does not match or the user 5 completes his/her journey and is no longer operating the shared vehicle 1.

If the newly captured biometric data does not match the previously captured biometric data, a video connection to the external screening facility can be reestablished to verify if the driver is an authorized user. Alternatively, the driver of the shared vehicle 1 is asked to stop driving the shared vehicle 1 (operation S16). In at least some alternative embodiments, the shared vehicle 1 can allow or request the driver to continue operating the shared vehicle 1 but restrict or disable operation of the vehicle (e.g., govern or slow the speed of the vehicle 1), restrict operation of the accessories (e.g., radio, HVAC), or otherwise interrupt or limit use of the shared vehicle 1. In alternative embodiments, the shared vehicle 1 automatically or autonomously drives to a determined location or the nearest place to park the vehicle 1. Operation of the shared vehicle 1 also can be blocked for the unauthorized driver.

Aspects of the present disclosure, for example, are described above with reference to block diagrams and operational illustrations of methods, systems, and computer program products according to aspects of the disclosure. The functions and acts noted in the flowchart may occur out of the order in which they are presented. For example, depending upon the functionality and acts involved, two operations shown in succession may in fact be executed substantially concurrently, executed in the reverse order, or not executed concurrently.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for operating a shared vehicle, the method comprising:
   recording data by means of a data acquisition device from a driver's license of a user;
   automatically checking the recorded data to determine whether the user is an authorized user;
   releasing the shared vehicle for use by the user if the user is an authorized user; and
   wherein before each release of the shared vehicle:
      acquiring biometric data of a holder of the driving license, the biometric data stored as part of the data on the driver's license;
      detecting, by means of a detection device for detecting the user, at least one biometric feature of the user, the detecting being performed while the user is in the shared vehicle;
      comparing the acquired data with the at least one detected biometric feature of the user, wherein a match results in a positive verification result; and
      in the event of a negative verification result of the check by the shared vehicle, establishing a video connection to a screening facility, and releasing the shared vehicle upon the shared vehicle receiving a release signal from the screening facility.

2. The method of claim 1, wherein:
   recording data by means of a data acquisition device from a driver's license of a user comprises recording data at least in part by means of a camera.

3. The method of claim 1, wherein:
   recording data by means of a data acquisition device from a driver's license of a user comprises recording data at least in part by means of a mobile electronic device carried by the user.

4. The method of claim 1, further comprising:
   automatically unlocking a door upon detection of an access authorization means by an access device of the shared vehicle; and
   a startup process of the shared vehicle remains locked and is released only in case of a positive verification result.

5. The method of claim 1, wherein detecting, by means of a detection device for detecting the user, at least one biometric feature of the user comprises:
   detecting the at least one biometric feature of the user using at least one non-optical wavelength range, in particular one or more wavelengths in an infrared range, in an ultraviolet range, or in a combination of infrared and ultraviolet range.

6. The method of claim 1, further comprising:
   checking whether the holder of the license is authorized to drive the shared vehicle at the current time, the checking based on the recorded data of the driver's license and its comparison with a vehicle-external database.

7. The method of claim 1, wherein:
   if the shared vehicle has a negative check result, establishing a video connection is performed automatically.

8. The method of claim 1, further comprising:
   automatically setting at least one ergonomic or comfort device of the shared vehicle as a function of the acquired data or as a function of at least one detected biometric feature.

9. The method of claim 1, further comprising:
   repeating, after commissioning the shared vehicle and while the user is driving the shared vehicle, the action of detecting at least one biometric feature by means of a detection device for detecting the user; comparing the biometric feature detected while the user is driving the shared vehicle with the biometric feature detected before commissioning the shared vehicle; and
   in the event of a deviation, taking at least one action selected from the group of actions comprising outputting a request to discontinue operation of the shared vehicle, limiting operation of the shared vehicle, causing the shared vehicle to automatically move to a nearest stopping place, locking the shared vehicle against use, or combination thereof.

10. A shared vehicle comprising:
    data acquisition means for collecting data from a driver's license;
    a detection device for detecting at least one biometric feature of a user positioned in the area of the shared vehicle;
    a data processing device for comparing the read-in data with the at least one detected one biometric feature;
    a releasing device adapted to, in case of agreement of the read data with the at least one detected biometric feature, release usage of the shared vehicle automatically for the user; and
    a video connection display device for establishing a video connection to a vehicle-external screening facility in the event of a negative verification result by the shared vehicle, and the releasing device being further configured to release the shared vehicle for use by the user upon receipt of the release signal from the screening facility.

11. A method for operating a shared vehicle, the method comprising:
    capturing first biometric data from an identification, the first biometric data corresponding to a biometric feature of a user;
    acquiring second biometric data from the user, the second biometric data corresponding to a biometric feature of the user;
    comparing the first biometric data to the second biometric data;
    if the first biometric data matches the second biometric data, enabling the shared vehicle to be operated by the user; and
    if the first biometric data does not match the second biometric data, establishing a video connection to a screening facility, and releasing the shared vehicle upon the shared vehicle receiving a release signal from the screening facility.

12. The method of claim 11, wherein acquiring second biometric data of the user comprises: acquiring the second biometric data through a detection device positioned inside the shared vehicle.

13. The method of claim 12, wherein acquiring the second biometric data of the user comprises: acquiring the second biometric data using a device selected from the group comprising a camera, an optical scanning device, or combination thereof.

14. The method of claim 12, wherein capturing first biometric data from an identification comprises:
    capturing the first biometric data from an identification through the detection device positioned inside the shared vehicle.

15. The method of claim 11, wherein acquiring second biometric data from the user comprises:
    acquiring the second biometric data through a mobile electronic device; and
    transmitting the acquired second biometric data from the mobile electronic device to an enabling device positioned in the shared vehicle.

16. The method of claim 11, wherein capturing first biometric data from an identification comprises:
    capturing the first biometric data from the identification driver's license through a mobile electronic device; and
    transmitting the acquired first biometric data from the mobile electronic device to an enabling device positioned in the shared vehicle.

17. The method of claim 11, wherein capturing first biometric data from an identification comprises:
    capturing the first biometric data from the identification before the user enters the shared vehicle and while all of the doors on the shared vehicle are locked;
    determining whether the captured first biometric data belongs to a user authorized to operate the shared vehicle; and
    unlocking at least one of the doors on the shared vehicle if the user is authorized to operate the shared vehicle.

18. The method of claim 11, further comprising: acquiring third biometric data from the driver while the shared vehicle is being driven; and comparing the third biometric data and the second biometric data.

19. The method of claim 18, further comprising: generating a signal requesting the driver to stop driving if the third biometric data does not match the second biometric data.

20. The method of claim 11, further comprising: acquiring third biometric data from the driver while the shared vehicle is being driven; and comparing the third biometric data and the first biometric data.

21. The method of claim 11, further comprising: automatically setting the position of a component of the shared vehicle if the first biometric data matches the second biometric data and the shared vehicle is enabled.

* * * * *